April 6, 1937. G. W. CRABTREE 2,075,800
SPRING COVER
Filed March 2, 1935 2 Sheets-Sheet 1
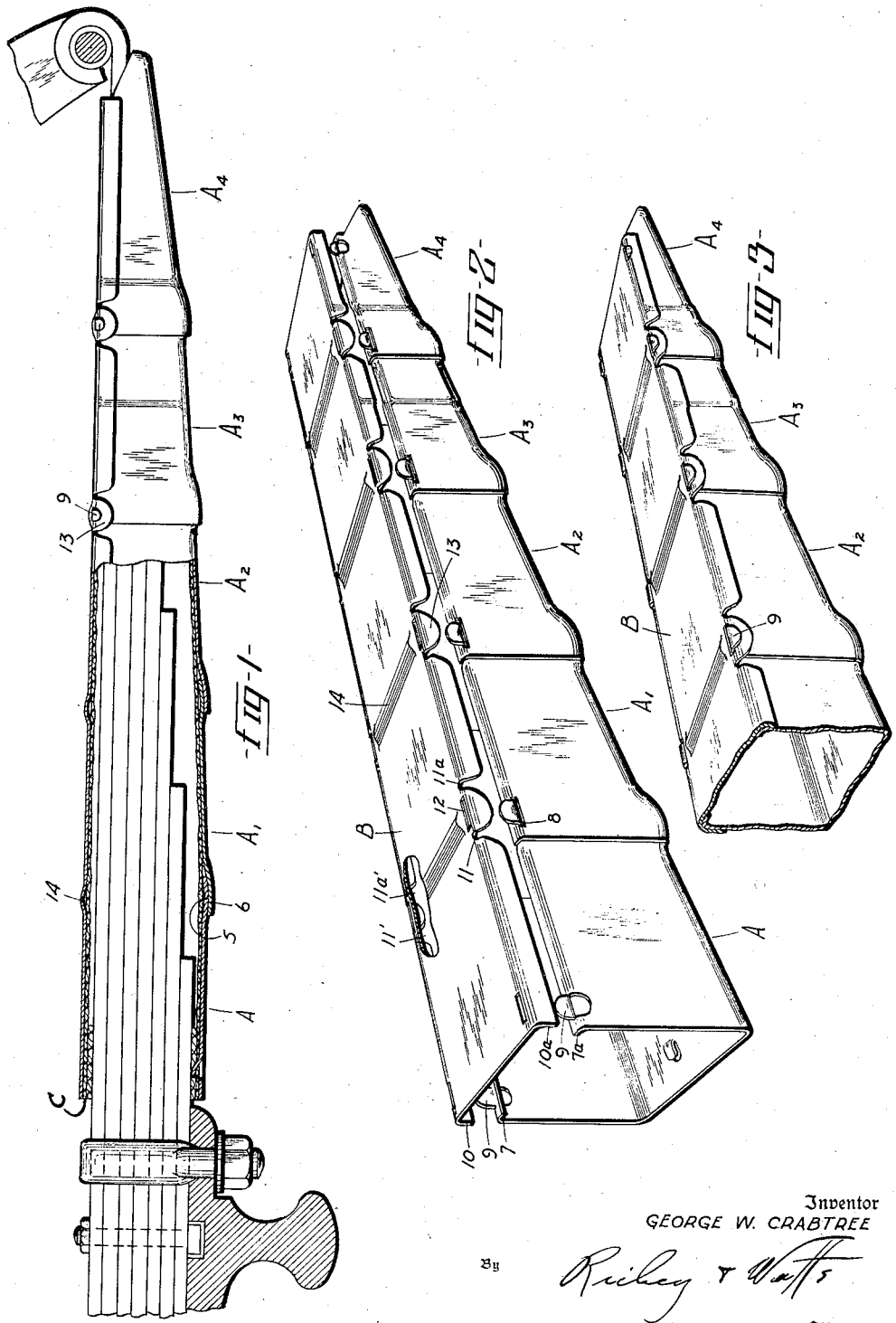
Inventor
GEORGE W. CRABTREE
By Riley & Watts
Attorney April 6, 1937.  G. W. CRABTREE  2,075,800
SPRING COVER
Filed March 2, 1935    2 Sheets-Sheet 2
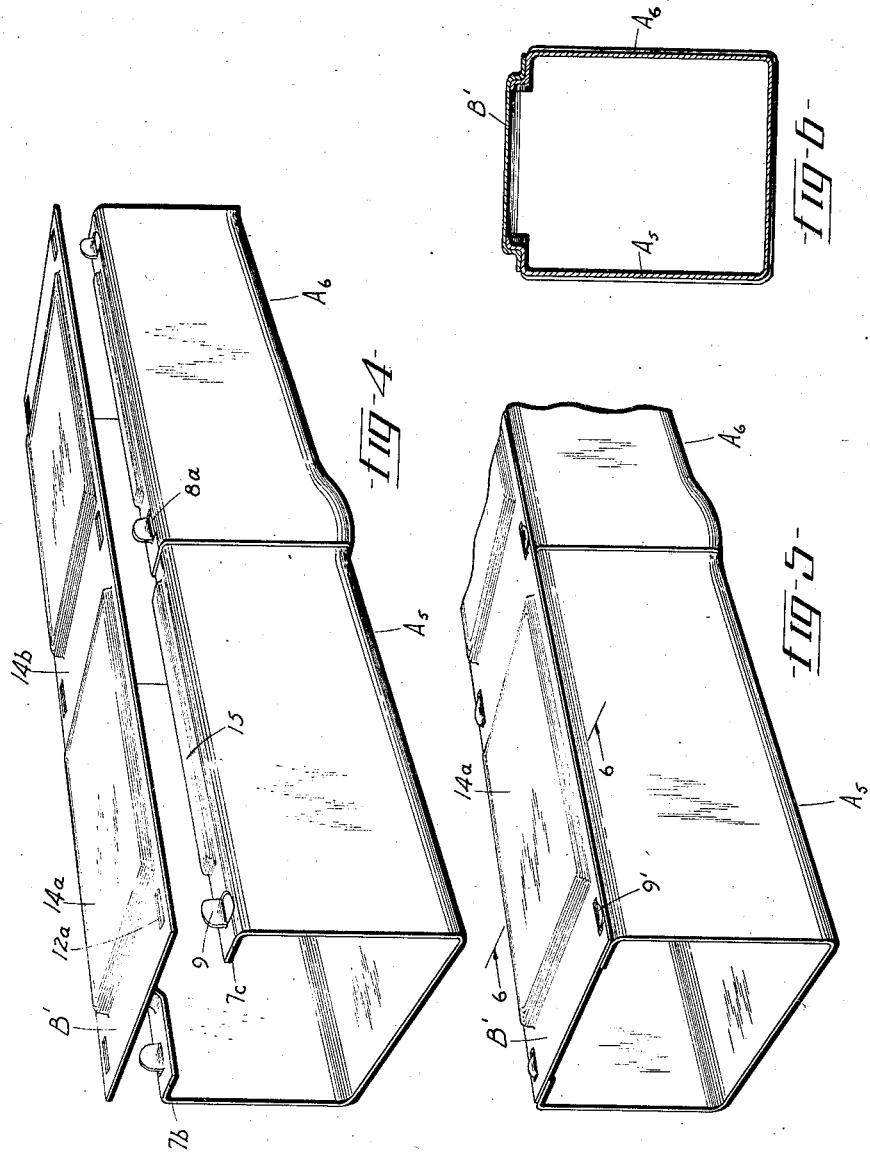
Inventor
GEORGE W. CRABTREE
By
Attorney Patented Apr. 6, 1937

2,075,800

UNITED STATES PATENT OFFICE 2,075,800

SPRING COVER

George W. Crabtree, Cleveland Heights, Ohio

Application March 2, 1935, Serial No. 9,100

7 Claims. (Cl. 267—37)

This invention relates to improvement in covers or casings for laminated vehicle springs, and the primary object of the same is to provide a leaf spring cover assembly of the jointed section type which is practical and efficient in service and which at the same time is relatively simple in construction and assemblage and capable of economical or low cost manufacture.

The present invention is concerned broadly with a spring cover assembly of the type illustrated and described in my copending application Serial No. 9,097, filed March 2, 1935, and deals particularly with an alternate type of cap member for the jointed box sections and means for detachably locking said member to said sections whereby the assembly is better adapted for certain types of vehicle springs.

In the drawings:

Figure 1 is a view in central longitudinal section and side elevation of a spring cover constructed in accordance with the present invention shown applied to a vehicle spring;

Figure 2 is a perspective view of the cover with the cap member suspended thereabove;

Figure 3 is a fragmentary perspective view of the cover with the cap member in assembled position;

Figures 4 and 5 are views similar to Figures 2 and 3 showing a modification in structure; and Figure 6 is a section taken about on the line 6—6, Figure 5.

Referring to the drawings in detail and first to Figures 1, 2 and 3, the assembly comprises a plurality of jointed body or box sections generally indicated at A, $A^1$, $A^2$, $A^3$, $A^4$ and a cap or cover section B. The body sections are substantially identical in construction except the first and last sections, which have their respective outer ends adapted to the spring contour at these points and to also snugly engage and retain a liner C in position in the cover. Considering for example, the section $A^1$ and $A^2$, the one end of $A^1$ telescopes partly into the adjacent end of $A^2$, and at the bottom of the cover, the ends are formed with interfitting arcuate bearing portions 5 and 6, note Figure 1.

This construction provides in effect a ball or rocking joint at the lower part of the sections. The arcuate bearing portions may be struck from the center of the hinges at the top of the sections so as to provide a true coacting bearing surface.

The hinges of the joints between the sections are formed in a simple manner and at the same time with a view toward providing a means for locking the cap B to the sections. Accordingly, the free edge portions of the body sections are flanged, as at 7 and 7a, and within the telescoped portion of these flanges, the outer wall of each joint is slotted, as at 8, and the inner wall thereof has a tongue 9 punched out of the metal and passed through the slot 8 and turned upwardly.

The cap member B is formed with side flanges 10 and 10a which are interrupted at spaced points along the length of the cap by hinge recesses or cut-outs 11, 11' and 11a, 11a' and between the latter the metal of the cover is slotted, as at 12, to receive the locking ears or tabs 9. A bracing or stiffening tab 13 results from the formation of the recesses 11 and 11a.

Formed transversely between each set of tongues 13 is a reinforcing rib 14. These ribs ensure against possible breakage of the cap at the point where the flexing action is greatest, viz: transversely between the opposed cut-out portions 11, 11' and 11a, 11a'. From practical experience, I have found that, without these ribs, if any breakage took place under long continuous service, it occurred transversely across the cap in the region of the recesses or cut-out portions 11 and 11a. Tests showed that when the cap was applied, the "spring" which resulted from the transverse spread of the cap flanges caused a slight concavity longitudinally of the cap in the region of the cut-outs 11a, and then when the cap was flexed during subsequent service the edges at the cut-outs or recesses were placed under tension, which eventually started a break at these points and thence across the cap. The ribs prevent the concavity from forming initially.

Figures 2 and 3 clearly show the method of assembling the sections and cap, the sections first being arranged with their contiguous ends in telescoped relation with the tongues 9 projecting upwardly through the slots 8. The box sections are then ready to be applied over the spring, it being preferred to first apply a liner coated with lubricant around the spring. With the box or body sections in place over the sides and bottom of the spring, the cap member may be applied and the ears 9 turned down as shown in Figures 1 and 3.

In Figures 4, 5 and 6 a modification is shown wherein the cap member, indicated at B', has straight side edges and is clamped on the body or box sections, which are indicated at $A^5$ and $A^6$. The arcuate bearing joints in the transverse wall of the sections is substantially the same as that shown in Figures 1, 2 and 3, while the hinge joint is constructed in a manner such as to provide a securing means for the cap B' and also to provide a hinge joint limited in its action, in conjunction with the bearing joint, but in this instance the tongues indicated at 9' are struck upwardly principally from the flanges 7b and 7c. Extending longitudinally of each flange is a rib or bead 15 which is pressed out of the metal of the flange, and at the point where the sections telescope into one another the said ribs are flattened, the outer flange at this point being slotted as at 8a to receive the tongues 9'.

The cap member B' has formed thereon a plurality of spaced, longitudinally extending ribs or non-flexible embossed portions 14a which are interrupted in the region of the hinges by depressed areas or portions 14b which localize the flexure of the cap to within these areas. While these longitudinal ribs or raised portions 14a perform substantially the same function as the transverse ribs 14 in that they prevent any tendency towards buckling of the cap with resultant placing of the edge portions thereof under tension during flexing of the assembly, they are also designed to fit, in locking or supporting position, over beads 15 in the box flanges 7b and 7c, the flexing action of the cap being localized to within the area 14b. The cap B' is provided with slots 12a adapted to receive the locking tongues 9' when the lid is applied over the sections as shown in Figure 5.

It will be seen that the sections together with the cap member may be easily pressed or stamped out of sheet metal and that no additional parts are required to provide the hinge joints between the sections or to connect the sections together in telescoped relation, the tongues 9 and 9' being pressed out of the metal of the sections and serving not only as a securing and hinge means but also serving to detachably secure the cap member to the sections.

It will be understood that the method of fabrication and assembly as set forth herein may be varied as desired, and that minor changes in structure may be adopted within the scope of the invention as defined by the appended claims.

I claim:

1. A cover for leaf springs comprising a plurality of substantially U-shaped body sections adapted to be inserted over three sides of a spring, said sections being arranged in partly telescoped relation, a cap member adapted to fit over said sections and having a series of slots formed therein, said sections at the point where they telescope into one another being provided with a plurality of arcuately pressed bearing joints and a hinge joint in opposed relation to said bearing joint, said hinge joint being formed by punching a series of locking tongues out of one section and extending the said tongues through slots formed in the coacting sections and cap member, whereby a combined hinge joint and securing means is provided for holding the sections in telescoped relation and also for securing the cap member on the sections.

2. A cover assembly for leaf springs comprising a plurality of substantially U-shaped body or box sections adapted to be inserted over three sides of a spring, said sections being arranged with their contiguous ends in telescoped relation, the transverse overlapped walls of said telescoped ends being pressed into arcuate bearing joints and the free edges of said end walls opposed to said joints having a hinge joint connection therebetween including locking tongues which are punched out of the wall of one section and project through slots formed in the overlapping walls of the contiguous section, and a cap member adapted to fit over said sections and having a series of slots in registration with said tongues whereby the cap may be locked to said sections by the joint tongues.

3. A cover assembly for leaf springs comprising a plurality of substantially U-shaped body or box sections adapted to be inserted over three sides of a spring, said sections being arranged with their contiguous ends in telescoped relation, the transverse overlapped walls of said telescoped ends being pressed into arcuate bearing joints and the free edges of said end walls opposed to said joints having a hinge joint connection therebetween, a cap member adapted to fit over said box sections, means for securing the cap member to the sections, said cap member being formed with means for localizing the flexing action thereof to the areas lying within the region of the hinge joints.

4. A cover assembly for leaf springs comprising a plurality of substantially U-shaped body or box sections adapted to be inserted over three sides of a spring, said sections being arranged with their contiguous ends in telescoped relation, the transverse overlapped walls of said telescoped ends being pressed into arcuate bearing joints and the free edges of said end walls opposed to said joints having a hinge joint connection therebetween including locking tongues which are punched out of the walls of one section and project through slots formed in the overlapped walls of the adjacent telescoped section, a flanged cap member adapted to fit over said sections and having a series of slots in registration with said tongues whereby the cap may be secured to the sections, the flanges of the cap being cut away on opposite sides of said hinge joints to localize the flexing action of the cap to the joint area.

5. A cover assembly for leaf springs comprising a plurality of substantially U-shaped body or box sections adapted to be inserted over three sides of a spring, said sections being arranged with their contiguous ends in telescoped relation, the transverse overlapped walls of said telescoped ends being pressed into arcuate bearing joints, the free side edges of the sections being formed with inter-connected inturned flanges having raised cap-engaging beads extending longitudinally thereof, a cap member for said sections having non-flexible raised embossments pressed therein which at their sides engage over said beads, said embossments being interrupted at spaced points along the length of the cap member by flattened portions which localize the flexing action of the cap to the joint area thereof.

6. A cover assembly for leaf springs comprising a plurality of substantially U-shaped body or box sections adapted to be inserted over three sides of a spring and a cap member adapted to fit over the sections, said sections being arranged with their contiguous ends in telescoped relation, the transverse overlapped walls of the telescoped ends being pressed into arcuate bearing joints, the free side edges of the sections being formed with inturned flanges having raised cap-engaging beads extending longitudinally thereof, the flange of one section at the point where it underlies the flange of an adjacent section having locking tongues punched therefrom and extending through registering slots formed in the overlapping flange and also in the cap member whereby the sections are jointed and locked to one another and the cap member is locked to the sections, said cap member being formed with non-flexible raised embossments which at their sides engage over said beads, said embossments being interrupted at spaced points along the length of the cap member by flattened portions which localize the flexing action of the cap to the joint area thereof.

7. A cover assembly for leaf springs comprising a plurality of substantially U-shaped body or box sections adapted to be inserted over three sides of a spring, said sections being arranged with their contiguous ends in telescoped relation, the transverse overlapped walls of the telescoped ends being pressed into arcuate bearing joints, the free side edges of the sections being formed with inturned flanges, means projecting from the flanges on one of said sections and engaging the next section adjacent said overlapped wall portions to secure said sections together, a cap member for said sections having its side edge portions shaped to be positioned upon said flanges, means on said cap co-operating with said flange means to secure said cap member to said sections whereby said flange means simultaneously joins said overlapped sections and said cap in a unitary structure.

GEORGE W. CRABTREE.